United States Patent [19]
Vaphiadis

[11] Patent Number: 5,562,197
[45] Date of Patent: Oct. 8, 1996

[54] WORKPIECE TRANSFER SYSTEM

[75] Inventor: John L. Vaphiadis, Birmingham, Mich.

[73] Assignee: Western Atlas, Inc., Hebron, Ky.

[21] Appl. No.: 309,917

[22] Filed: Sep. 21, 1994

[51] Int. Cl.$^6$ ................................................ B65G 25/02
[52] U.S. Cl. .......................................... 198/776; 414/750
[58] Field of Search ................................... 198/776, 427, 198/428, 468.6; 414/750

[56] References Cited

U.S. PATENT DOCUMENTS

| | | | |
|---|---|---|---|
| 2,275,433 | 3/1942 | Herold et al. | 198/776 |
| 2,315,205 | 3/1943 | Herold | 198/776 |
| 2,658,608 | 11/1953 | Wehmiller | 198/776 |
| 3,871,534 | 3/1975 | Bursk | 198/776 |
| 4,669,607 | 6/1987 | Mason | 198/774 |
| 4,750,605 | 6/1988 | Brems et al. | 198/468 |
| 4,865,180 | 9/1989 | Brems et al. | 198/468 |
| 5,125,497 | 6/1992 | Sundermann | 198/774.1 |
| 5,314,330 | 5/1994 | Orbeck | 198/776 |

*Primary Examiner*—William E. Terrell
*Assistant Examiner*—Tamara Kelly
*Attorney, Agent, or Firm*—Barnes, Kisselle, Raisch, Choate, Whittemore & Hulbert

[57] ABSTRACT

A system, method and apparatus for rapidly conveying workpieces successively through multiple stations by providing an integrated dual shuttle transfer mechanism conveyor operable in an intermittent repetitive lift and carry workpiece travel cycle mode. The dual shuttles cooperate to alternately advance an in-line array of workpieces at twice the rate of a conventional single shuttle by successively alternately handing off the workpiece array from the workpiece loaded shuttle to the companion empty shuttle for the next array advance thereon while the other shuttle as so unloaded retracts to reload a workpiece on its upstream end. Workpiece carrier rails of each shuttle reciprocable vertically adjacent and past one another between upper and lower elevational limits and horizontally between advance and retract stroke end limits. A shuttle drive causes the dual sets of carrier rails to move through identical closed loop lift and carry travel paths disposed in laterally adjacent vertical planes and in a 180° out-of-phase directional and positional relationship. Dual drive racks are respectively operable coupled one each to set of carrier rails for propelling the same horizontally between advance and retract stroke end limits. Driving gears engage the racks for imparting rack reciprocation thereto and powered input gears drive the rack gears for producing synchronous counterrotation thereof for causing the carrier rail sets to reciprocate horizontally in a 180° out-of-phase travel directional and positional relationship relative to one another. The drive also includes a plurality of combined counterbalancing and shuttle lifting stations.

12 Claims, 4 Drawing Sheets

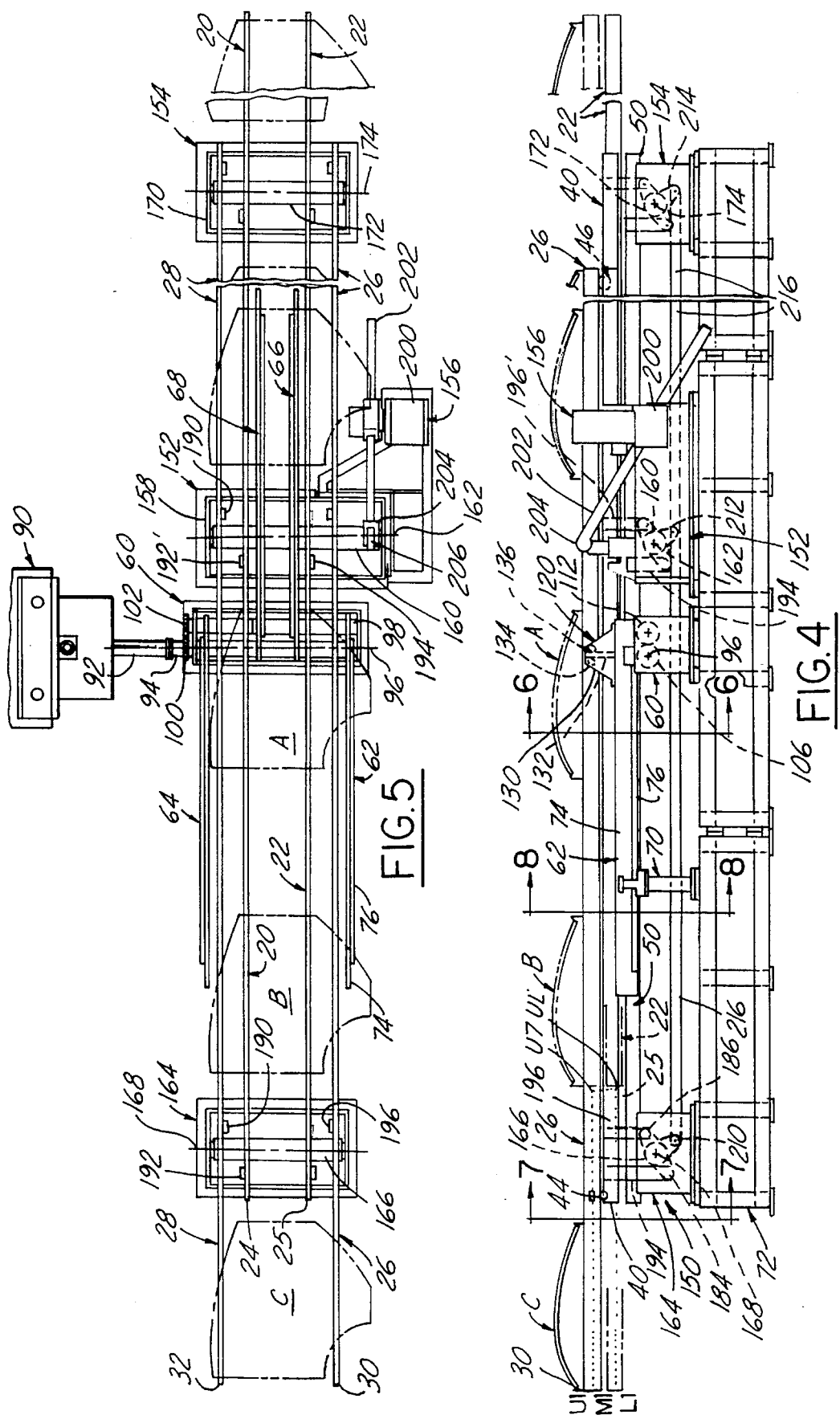

WORKPIECE TRANSFER SYSTEM

FIELD OF THE INVENTION

This invention relates to workpiece conveying and processing lines having multiple stations, and more particularly to a system and transfer mechanism for conveying workpieces from one station to another and operable in an intermittent transfer mode.

BACKGROUND OF THE INVENTION

Various devices and systems are known that lift and carry workpieces from one station to another, such as endless chain and belt conveyors and shuttle-type transfer mechanisms. In multiple station transfer lines with multiple work stations spaced along the line, workpieces are typically received on locators therein and a transfer shuttle mechanism is provided for lifting and carrying workpieces from one station to another. Usually, the workpiece carrier or "live" rails of the shuttle travel in a closed loop rectangular travel path disposed in a vertical plane with the lower horizontal or retraction path leg or run oriented to underlie all of the workpieces. The entire shuttle is raised and lowered generally vertically in this plane by suitable elevator mechanisms actuated by a drive mechanism which in operation raises the shuttle to lift the workpieces on the live rails generally vertically above the stationary locators, whereupon the shuttle live rails are actuated by a synchronized horizontal reciprocating drive mechanism to advance the workpieces along a horizontal run of the travel path of the shuttle. Then the elevators are lowered to move the entire shuttle generally vertically downwardly to deposit the advanced workpieces individually in the next successive work stations. After such workpiece placement the elevators further lower the shuttle sufficiently to disengage and clear the workpieces, and the live rails are then retracted along the lower horizontal run of their travel path to reposition the shuttle for the next transfer cycle.

Such shuttle-type transfer mechanisms are preferred, and indeed required, in many processing lines over endless belt, chain or other type systems for conveying workpieces even though the latter may be less expensive in construction and capable of faster conveying speeds. Shuttle-type transfer mechanisms are unique in having lift and carry functions which can be precisely synchronized with the various work cycles of the multiple stations in a processing line to provide, at predetermined precise locations and with split second timing, accurate positioning of the individual workpieces being transferred along the processing line. Thus, by utilizing a shuttle-type transfer line, each workpiece can be intermittently advanced and then held stationary while located precisely at a known position at a known point in time, and the various station work cycles thereby precisely coordinated with workpieces in an intermittent conveying process. This characteristic of shuttle-type transfer mechanisms renders them highly suited for high speed automated processing lines, particularly those where computer controlled and programmed robotic or other automated mechanisms are employed as adjuncts to the work being carried out in the processing line.

For example, high speed repetitive progressive die transfer press sheet metal stamping operations are conventionally employed to impart by progressive stamping the finished curvature and other features into automotive body door panels. The press is operated through its reciprocating work stroke stamping cycle as the blanks are advanced through the progressive dies of the press, and the internal press transfer mechanism and/or a separate press unloader operates rapidly to individually remove each finished stamping one at a time in a very short cycle, which may be on the order of 2 to 4 seconds. Although a typical endless-loop-type conveyor can receive the finished stampings from the press unloader at an operating rate which can keep up with such a rapid work cycle so as to transport a line array of the finished door panels downstream to a gang of unloading stations, the manual operation of unloading the stampings from the downstream end of such a conveyor usually requires a crew of several unloading workmen in order to keep up with the conveyor delivery speed at the conveyor unloading stations.

An automated single robotic unloader has not been available to do this job because its cycle time is too great. The conveyor part unloading cycle requires that the finished stamping be engaged or gripped while on the conveyor, then lifted off of the conveyor, then carried to a storage rack while manipulating the workpiece, usually through a 90° bodily rotation, and then located in a storage slot compartment in a multiple workpiece transit container. After the part is so stored and released, the part unloader must continue to cycle back to the conveyor to pick up the next body panel stamping. The total time of this conveyor unload cycle thus greatly exceeds the rate at which the body stamping workpieces need to be loaded onto and advanced by the conveyor.

Even using a gang of automated robot unloading mechanisms for simultaneously gang unloading a fast moving conventional conveyor does not solve the problem. Generally, robot unloaders have not been commercially developed to a state where they can reliably rapidly find or locate workpieces carried on an endless belt conveyor, even when intermittently operated, much less when the mode of operation produces continuous movement of the workpieces on the conveyor. Rather, to achieve safe, reliable and efficient automated unloading operations, robotic unloading mechanisms need the accurate synchronization provided by a shuttle-type transfer mechanism such that the workpiece stampings are reliably and accurately delivered to an unloading station, held immobile in a dwell phase of the cycle at a precise location at a given point of time in the work cycle, and for a precise predetermined period of time to thereby enable the robot to find, securely engage and lift the workpiece off and out of the unload station.

Although shuttle-type transfer systems and robotic unloaders are thus highly compatible for use in automated processing lines, conventional shuttle-type transfer mechanisms inherently impose another cycle rate limitation. Due to their aforementioned inherent closed loop shuttle mode of travel motion, there is a minimum finite cycle time required for the typical shuttle mechanism to move through its rectangular travel path in a vertical plane to accomplish the sequence of (1) engaging the workpiece, (2) lifting the same, (3) carrying the workpiece on an advance stroke, (4) lowering the workpiece onto a fixed locator, (5) continuing to lower to the clearance position and then (5) moving on its retraction stroke back to the pickup position in its path. The minimum duration of this cycle is limited by such factors as the horizontal and vertical stroke distances needed, the mass of the moving parts of the transfer shuttle mechanism itself and the mass of the total workpiece load being carried by the transfer shuttle, all of which must be respectively accelerated, decelerated and held stationary, the need to smoothly and rapidly transfer workpieces both vertically and horizontally without jarring, shocking or mislocating them, and the limitations of the power drive train components. All of these factors constrain the maximum operating speed and hence minimum cycle time hitherto achievable with a conventional shuttle-type transfer mechanism.

In view of the foregoing considerations and problems, as far as is known it has not hitherto been feasible to utilize shuttle-type transfer mechanisms and associated synchronized automated robotic unloading mechanisms to thereby fully automate high speed workpiece processing lines because the maximum piece loading and/or unloading rate of the transfer conveyor line is not fast enough to keep up with the short cycle, high output rate of such high speed machines.

OBJECTS OF THE INVENTION

Accordingly, one object of the present invention is to provide an improved workpiece transfer system, method and apparatus which is capable of receiving and locating workpieces at a faster rate than hitherto possible while providing all of the other known advantages characteristic of shuttle-type transfer mechanisms such as precise intermittent conveyance of workpieces from one station to another in succession along the processing line.

Another object of the present invention is to provide an improved transfer system, method and apparatus of the aforementioned character in which a succession of workpieces being rapidly transported on the transfer mechanism may be simultaneously unloaded from a series of successive unload stations so that a plurality of automated unload mechanisms each having a relatively slow unload cycle for each piece can be rendered compatible with a fast piece load rate at the upstream loading end of the transfer mechanism.

A further object is to provide an improved shuttle-type transfer mechanism and system of the aforementioned character in which successive work stations may be incorporated into the transfer line intermediate its load and unload stations and which are compatible with conventional automated workpiece processing mechanisms, such as robots, and which is capable of operating at a faster production rate than hitherto obtainable with conventional shuttle-type transfer mechanisms.

Yet another object is to provide an improved transfer system and mechanism which is capable of moving workpieces in half the ordinary cycle time of a conventional shuttle-type mechanism, and/or in which the drive mechanism need only be operated through a start/stop mode once for every two workpieces being conveyed, thereby decreasing overheating of the transfer system and/or enabling the use of larger horse power motors.

Still another object is to provide an improved transfer mechanism of the aforementioned character in which the lifting forces required to drive the system components are internally counterbalanced in a very simple and efficient manner without the need for conventional air spring or other type counterbalance mechanisms.

A further object is to provide an improved workpiece transfer mechanism of the aforementioned character which is capable of being operated smoothly and rapidly to transfer workpieces generally vertically and horizontally without jarring, shocking or mislocating them, and which is rugged, durable, reliable, relatively service and maintenance-free, relatively simple in design and economical to manufacture, assemble and operate.

SUMMARY OF THE INVENTION

A system, method and apparatus for conveying workpieces successively through a generally horizontally arranged line of multiple stations by providing an integrated dual shuttle transfer mechanism conveyor operable in an intermittent repetitive lift and carry workpiece travel cycle mode. The dual shuttles of the transfer mechanism cooperate to alternately advance an in-line array of workpieces at twice the rate of a conventional single shuttle by successively alternately handing off the workpiece array from the workpiece loaded shuttle to the companion empty shuttle for the next array advance thereon while the other shuttle as so unloaded retracts to reload a workpiece on its upstream end.

The two shuttle mechanisms each have workpiece carrier rails reciprocable vertically adjacent one another between upper and lower elevational limits and horizontally between advance and retract stroke end limits. A shuttle drive operably coupled to the shuttle mechanisms causes the carrier rails of each shuttle to move through the same closed loop lift and carry travel path disposed in a vertical plane and in a 180° out-of-phase positional relationship.

The dual shuttle drive includes dual drive racks respectively operable coupled one to each of the carrier rails of each shuttle mechanism for propelling the same horizontally between advance and retract stroke end limits. Driving gears engage the racks for imparting rack reciprocation thereto and powered input gears drive the rack gears for producing synchronous counterrotation thereof for causing the carrier rails to reciprocate horizontally in a 180° out-of-phase travel directional and positional relationship relative to one another.

The dual shuttle drive also includes a plurality of combined counterbalancing and shuttle lifting stations spaced apart longitudinally of the shuttle mechanism and each including an oscillatable balance and driving beam. The lift linkages are operably coupled between each shuttle mechanism and the beam through oppositely acting moment arms such that the respective weights of each shuttle mechanism counterbalance one another. The beams are operated in unison by a power driven drag link to vertically reciprocate the dual shuttles in 180° out-of-phase relationship to one another.

BRIEF DESCRIPTION OF THE DRAWINGS

The foregoing as well as other objects, features and advantages of the present invention will become apparent from the following detailed description, appended claims and accompanying drawings in which:

FIG. 4 is a fragmentary semi-schematic side elevational view of a dual shuttle type transfer mechanism illustrating one preferred embodiment thereof as employed in the system of the invention and operable for practicing the method of the invention;

FIG. 5 is a fragmentary semi-schematic plan view of the dual shuttle transfer mechanism of FIG. 4;

DETAILED DESCRIPTION OF PREFERRED EMBODIMENTS

Transfer System and Method

Figure 1:
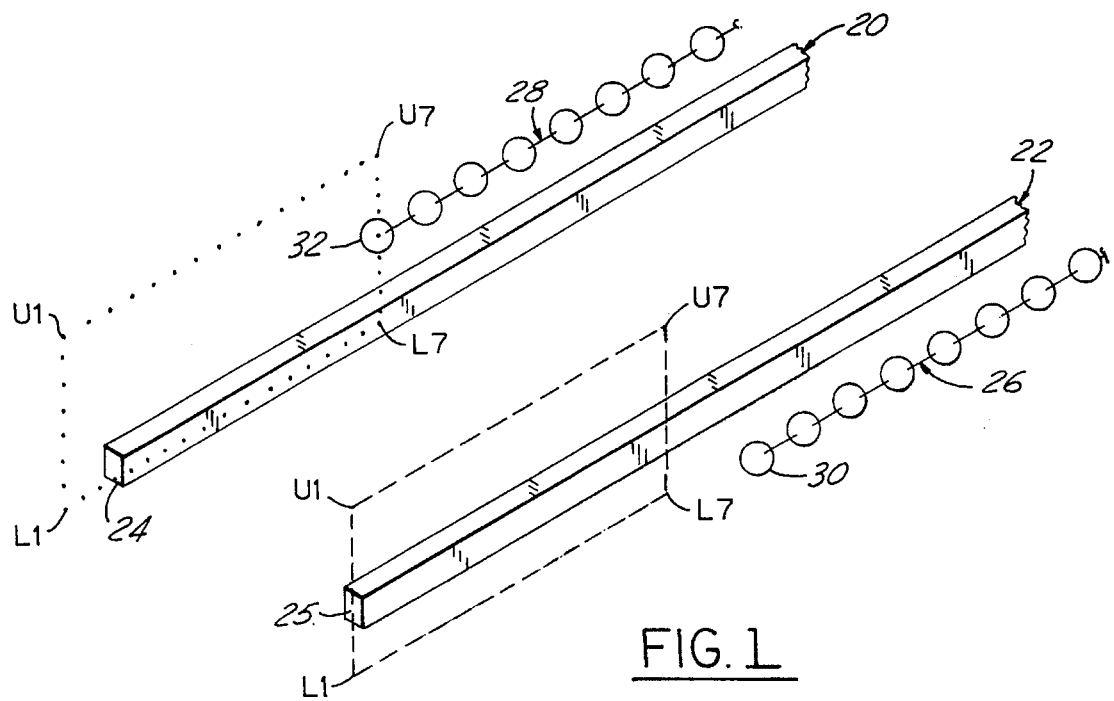
FIG. 1 is a fragmentary perspective view of one exemplary but preferred embodiment of the primary workpiece lift and carry rail components of the system, method and shuttle-type transfer mechanism of the invention and illustrated schematically to facilitate understanding of the interrelationship and relative travel motion of these carrier rail components in practicing the invention.

Referring to FIG. 1, the system and method of the invention employs in the exemplary but preferred embodiment illustrated herein two shuttle-type transfer mechanisms each individually operable as sub-combinations to cycle through a separate closed loop raise, carry, lower and retract path of travel, and combined and interrelated in accordance with the invention to transfer individual workpieces from a loading station at the upstream end of the apparatus to a downstream unloading station, with the workpieces aligned in a row and carried at equally spaced increments therealong, by alternately "handing-off" all of the workpieces being carried on one shuttle mechanism to the other shuttle mechanism between each successive advance of the row of workpieces.

The two transfer mechanisms operate 180° out of phase so that one advances the row of workpieces while the other is retracting and vice versa. FIG. 1 illustrates the primary carrier rail components of the transfer mechanism of the invention in which a first transfer mechanism has an inner pair of workpiece carrier rails 20 and 22 and a second transfer mechanism has an outer pair of workpiece carier rails 26 and 28. The workpiece carrier rails of each transfer mechanism are spaced laterally apart parallel to one another and operate as "live" rails which are mounted for receiprocation horizontally along an underlying support or "dead" rails (described in more detail hereianfter) which are raised and lowered vertically by suitable elevator mechanisms (also described in more detail hereinafter). The general construction and arrangement of these live rails and dead support rails in single shuttle transfer devices are disclosed in U.S. Pat. Nos. 4,669,607 and 4,750,605, the disclosures of which are incorporated herein by reference.

Live rails 20 and 22 in operation of the first shuttle are thus movable in a vertical plane through a closed loop path of travel indicated, for example, by tracing the upstream end 25 of live rail 22 through the vertical plane travel path indicated by dash lines in FIG. 1 and labeled at its four corners by the cartesian coordinates L1, U1, U7 and L7. This path of travel is also schematically illustrated in elevation in FIG. 2 wherein the abscisea coordinates are labeled 1 through 7 to identify six horizontal travel increments, and two vertical travel increments are identified by three ordinate points labeled "U" (uppermost elevation), "M" (midpoint of vertical path), and "L" (lowermost elevation). The typical lift and carry closed loop operational mode causes a given point on rails 20 and 22, e.g., live rail upstream ends 24, 25 of rails 20, 22, to move vertically upwardly through a workpiece lift stroke from coordinate L1 to coordinate U1, then horizontally through a workpiece advance stroke from coordinate U1 to coordinate U7, then vertically downwardly through a lowering stroke from coordinate U7 to L7, and finally horizontally on a retraction or return stroke from coordinate L7 to L1. As will be well understood in the art, each of live rails 20 and 22 of the first shuttle mechanism are suitably structurally and functionally interconnected to move together in unison in this fashion.

The second shuttle mechanism of the dual shuttle transfer system of the invention comprises another pair of live carrier rails 26 and 28 indicated schematically in FIG. 1 by the interconnected chain line row of circles and each having an upstream end 30 and 32 respectively. Preferably, in accordance with one feature of the invention, rails 26 and 28 straddle rails 20 and 22 and thus will be referred to as the "outside" carrier rails of the combination dual shuttle mechanism, and likewise rails 20 and 22 will be referred to as the "inside" rails. Outside rails 26 and 28 are also structurally interconnected to operate in unison. Hence the upstream or leading end 32 of outside rail 28 likewise moves in a closed travel path disposed in a vertical plane, as illustrated schematically by the dotted line pattern rectangular layout in FIG. 1, and sequential through travel path coordinates L1, U1, U7 and back to L1.

Figure 2:
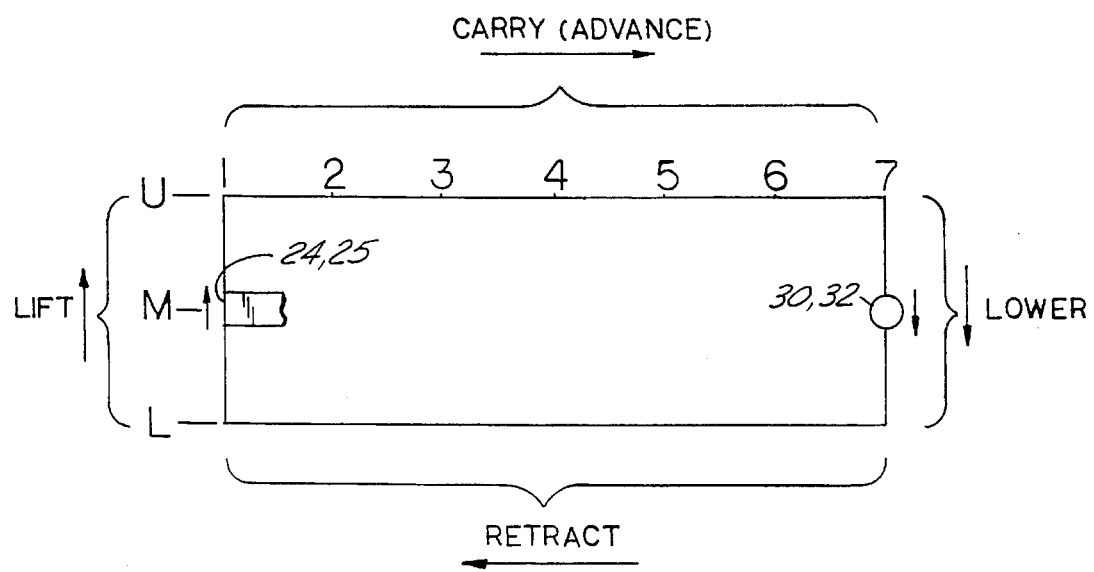
FIG. 2 is a schematic diagram in vertical elevation of the closed loop travel path excursion of the upstream end points of both of the primary carrier rail components illustrated in FIG. 1.

In accordance with another feature of the present invention, each of the respective shuttle type transfer mechanisms are constructed and arranged so that rails 20, 22 of the first shuttle mechanism move 180° out of phase through the same closed loop travel path as do rails 26, 28 of the cooperative second shuttle mechanism. This is indicated schematically in the perspective view of FIG. 1 wherein the travel path of end point 25 of rail 22 (illustrated in dash lines) and the travel path of end point 32 of rail 28 (illustrated in dotted lines) are identical in orientation and layout to one another so as to be laterally aligned in their respective vertical planes and thus coincident by horizontal projection of one onto the other. It will also be seen in FIG. 1, as well as in the horizontally superimposed showing of the two travel paths in FIG. 2, that ends 24, 25 of inner carrier rails 20, 22 move through points on their travel path in a 180° out-of-phase travel directional and positional relationship with the ends 30, 32 of outer rails 26, 28. Thus, as shown in FIGS. 1 and 2, when leading ends 24 and 25 of inner rails 20 and 22 reach coordinate M1 in their travel path, corresponding to the midpoint on their vertical lift stroke, leading ends 30, 32 of rails 26, 28 have reached and are located at coordinate M7, namely the midpoint in their vertical downward travel on their lowering stroke. Likewise, if upstream ends 24, 25 of inner rails 20, 22 are traveling along the carry/advance horizontal stroke and are at coordinate point U3, leading ends 30, 32 of outer rails 26, 28 will have reached and be located at coordinate L-5, etc. It will thus be seen that the two sets of carrier rails are always moving and positioned oppositely to one another through and in coincident travel paths.

Moreover, in accordance with a further feature of the present invention, the movement of the two interrelated sets of carrier rails is mechanically synchronized by the mechanism of the invention to maintain this exact 180° out-of-phase travel directional and positional relationship throughout their rectangular travel paths in the vertical plane. Thus, in the typical mode of operational motion in opposite directions of each shuttle, i.e., their respective dwell, acceleration, constant velocity, deceleration velocity mode curves for each cycle portion are identical but are mechanically held exactly in phase with one another (as will be explained in more detail hereinafter).

FIGS. 3A–3H schematically illustrate the manner in which the inner and outer carrier rails 20, 22, 26 and 28 cooperate with one another in accordance with the invention to advance workpieces. In FIGS. 3A–3H the diagrams are laid out with the same coordinates as employed in FIGS. 1 and 2 for convenience in cross referencing between these drawing figures. Thus, it will be seen in FIG. 3A leading ends 24, 25 of inner carrier rails 20, 22 are located at coordinate M1. Likewise, leading ends 30, 32 of outer rails 26, 28 are located at coordinate M7. This relative positional relationship of the carrier rails in FIG. 3A thus corresponds to that shown in FIGS. 1 and 2.

The arrow head symbols respectively associated with upstream ends 24, 25 and 30, 32 of inner rails 20, 22 and outer rails 26, 28 indicate the direction of travel the rails will follow in their next sequence of motion. Also, in FIGS. 3A–3H a series of workpieces or parts being transferred, such as the aforementioned body door panels, are illustrated schematically by the blocks A, B and C. The conventional part unloader portion of the internal transfer mechanism of the press (not shown) which delivers the finished workpiece (parts A, B, C) from the last station of the press to a transfer conveyor upstream loading station is indicated schematically by bar TP in FIGS. 3A, 3C, 3D, 3F and 3G. In the operation of transfer apparatus employed in the system and method of the invention as thus far described, it will be seen from the sequence of relative motions of the inner and outer transfer rails 20, 22 and 26, 28, as illustrated in sequence in FIGS. 3A–3H, the closed loop rectangular travel path is likewise broken down into three positions of vertical travel and two positions of horizontal travel.

Figure 3A:
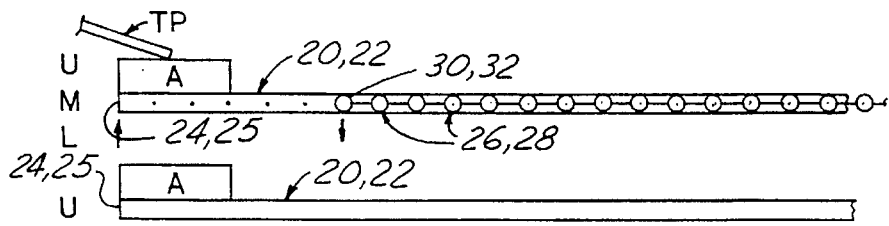
FIGS. 3A–3J are successive diagramatic illustrations of the two primary workpiece lift and carry components operable in the closed loop mode of FIGS. 1 and 2 to illustrate their sequence of operation and interrelated positions relative to one another in completing a series of workpiece transfer cycles in accordance with one embodiment of the system, method and mechanism of the invention.

Referring to FIG. 3A, a finished workpiece A is delivered by press unloader TP to a suitable loading position in the lift path of travel of inner transfer rails 20, 22. When inner rails 20, 22 reach the mid-level position where their upstream ends 24, 25 are at coordinate M1 (midpoint of their upward vertical travel on their lift stroke) the rail motion may be programmed to enter a dwell phase having a duration, for example, of 2.0 seconds. During this dwell phase press unloader TP carries part A out from the last station of the transfer press to a position over the part receiving nest structure provided on rails 20, 22 (not shown in FIGS. 3A–3J; described hereinafter with reference to FIG. 7). This accurately locates part A slightly above and aligned vertically with the nest, and then unloader TP releases part A so it drops a slight distance by gravity onto the rail nest awaiting therebeneath.

Figure 3B:
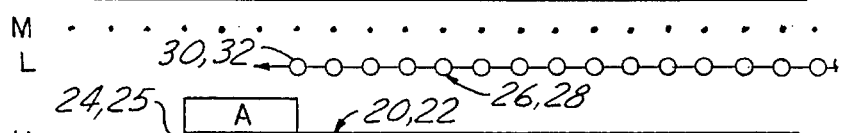

Then, as shown by the rail movement from FIG. 3A to 3B positions inner rails 20, 22 move vertically upwardly to lift part A to the uppermost elevation U of vertical lift travel of these rails. It will be understood that unloader TP would have been retracted clear from the transfer rail travel path prior to initiation of this portion of upward travel of inner rails 20, 22. Simultaneously, outer rails 26, 28 move vertically downwardly from the vertical mid-level elevation M to the lowermost elevation L.

Figure 3C:
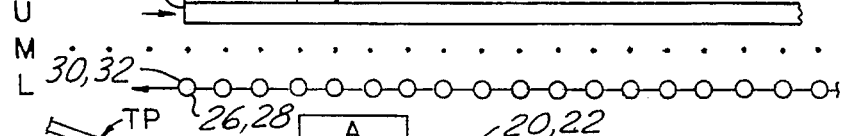

Then, as shown by comparing FIG. 3B to FIG. 3C, the carry/advance stroke of inner rails 20, 22 is initiated to horizontally advance part A while the same is carried at elevation U from the start position of FIG. 3B (horizontal coordinates 1–4 to the FIG. 3C end of advance stroke position (horizontal coordinates 7–10). Note that simultaneously with initiation of this advance/carry motion of inner rails 20, 22, outer rails 26, 28 initiate their rail retraction stroke, moving horizontally along the lowermost elevation L of the rectangular travel path from the retract start position shown in FIG. 3B to the end of retract stroke position of FIG. 3C. This positions the upstream ends of outer rails 30, 32 and the associated part nest structure thereon directly beneath the next part B as it is transferred into loading position by press unloader TP.

Figure 3D:
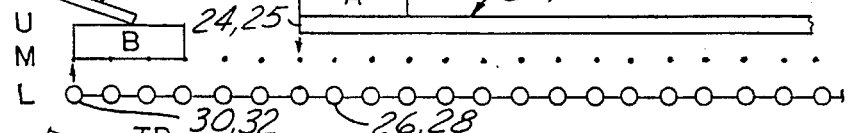

Then, as seen in comparing rail positions in FIGS. 3C and 3D, the transfer mechanism motion causes inner rails 20, 22 to move vertically downwardly in their lowering stroke from uppermost elevation U to midpoint elevation M. Simultaneously outer rails 26, 28 move vertically upwardly in their lift stroke from elevation L to midpoint elevation M. Both sets of rails now enter another dwell phase of the cycle in which second part B is released from press unloader TP to drop onto and engage an upstream part receiving nest on outer rails 26, 28.

Note that, in addition, as inner rails 20, 22 are so lowered vertically from elevation U to the same elevation M to which the outer rails were raised, the next or second part receiving nest located downstream of the upstream nest on outer rails 26, 28 is now aligned vertically beneath part A in coordinate position 7–10. Hence part A is now either spaced slightly above or now located on this second nest seat of outer rails 26, 28. Thus, in accordance with one principal feature of the invention, at this point in the cycle a "hand-off" of part A from the inner to outer rails is either ready to occur or does occur as the rails reach these respective mid elevation points in their respective travel.

Figure 3E:
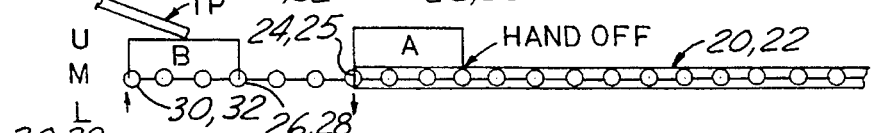

Referring to FIGS. 3D and 3E, outer rails 26, 28 now move vertically upwardly from midpoint elevation M to uppermost elevation U, thereby lifting both parts A and B on the outer rails 26, 28 to elevation U. Simultaneously, inner rails 20, as now so unloaded, 22 are lowered vertically from mid elevation M to lowermost elevation L.

Figure 3F:
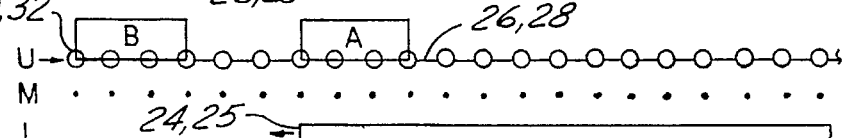

Then, as seen in FIGS. 3E and 3F, outer rails 26, 28 begin their advance/carry stroke to thereby advance both parts A and B horizontally to their advance end limit position of FIG. 3F. Simultaneously, the part-empty inner rails 20, 22 are retracted through their retraction stroke from the position of FIG. 3E to the retraction end limit position of FIG. 3F. The empty upstream part nest on the inner rails is now vertically aligned beneath another part C carried to the loading position by the transfer press unloader TP.

Figure 3G:
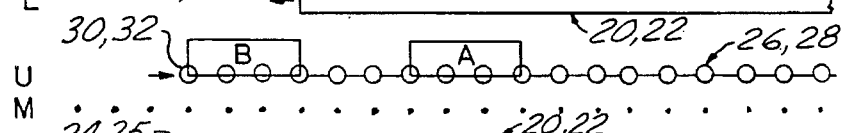

The cycle continues as shown in FIGS. 3F and 3G and is repeated. Thus inner rails 20, 22 are raised from their lowermost lift end position of FIG. 3H at elevation L to the part loading position of FIG. 3G (M1) and part C loaded on the empty upstream nest of inner rails 20, 22. Simultaneously, outer rails 26, 28 are lowered from their uppermost elevation U to mid-level M, thereby positioning both parts A and B over and onto respectively associated empty second and third nests on inner rails 20, 22. Then as inner rails 20, 22 are initially being raised further vertically toward upper level U, as shown by comparing FIGS. 3G and 3H, another "hand-off" occurs, but this time from outer rails 30, 32 to inner rails 20, 22 so that parts A and B as well as part C are all lifted conjointly on inner rails 20, 22 to uppermost level U, and all nests on the outer rails 26, 28 have been emptied.

Figure 3H:
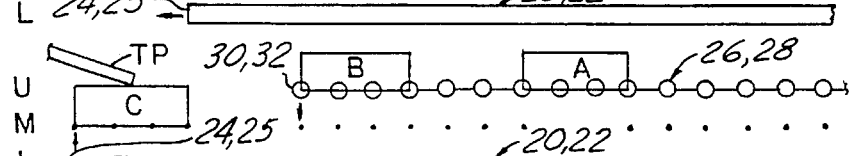
Figure 3I:
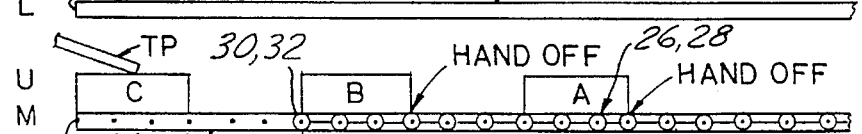
Figure 3J:
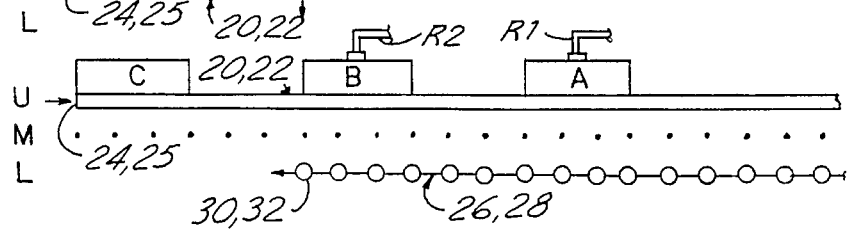

With parts A and B now having been so transferred downstream by the conveyor transfer system of the invention, these parts are cued up in their respective unload positions shown in FIG. 3H. Then a pair of automated robot unloader mechanisms, designated R1 and R2 in FIG. 3H, are automatically simultaneously operated to respectively engage parts A and B and then lift these parts off of inner rails 20, 22. Robots R1 and R2 then operate further preferably simultaneously to manipulate the unloaded parts through the robot transport cycle to their designated receiving compartments in an in-house transport container. Although the total cycle time for the robot to accomplish this task typically exceeds the rate at which each of the parts A, B and C are delivered seriatum from the transfer press to the transfer system of the invention, the duration of the portion of the robot cycle required to engage and lift parts A and B clear of conveyor rails 20, 22 is shorter than the dwell period time of rails 20, 22 when in their unload phase of their travel cycle shown in FIGS. 3H. Alternatively, and preferably, robots R1 and R2 may be programmed to remove parts A and B during the mid elevation dwell position of FIG. 3G.

From the foregoing it will now be understood that the transfer system and method of the invention can readily keep up with the rapid unload cycle of the transfer press. Moreover, the system can continue advancing workpieces downstream to as many unload stations as are needed or desired, each such unload station being provided with its own robot operable in a robot array simultaneously so that all parts cued up in aligned unloading stations can be preferably simultaneously removed from the conveyor. Hence even slower robot cycling times can be thereby accommodated without slowing the loading cycle capacity of the transfer system of the invention.

Transfer Apparatus

Figure 6:
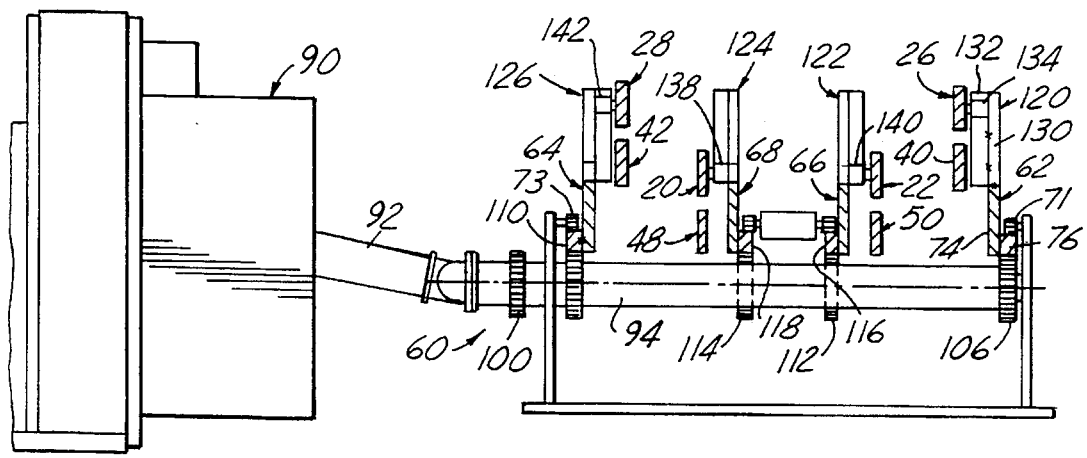
FIG. 6 is a semi-schematic cross sectional view taken on the line 6—6 of FIG. 4.
Figure 7:
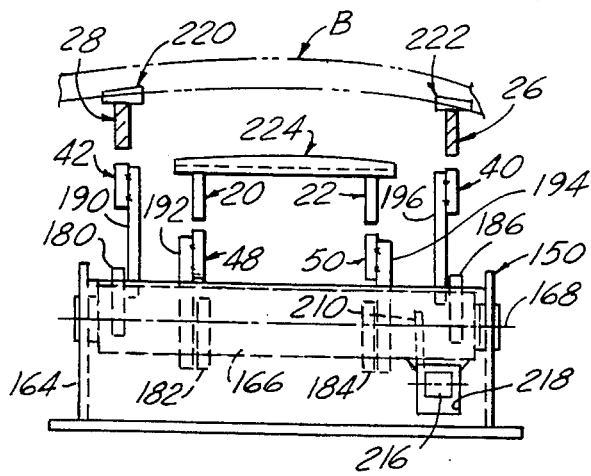
FIG. 7 is a semi-schematic cross sectional view taken on the line 7—7 of FIG. 4.

Referring now in more detail to FIGS. 4–10, one exemplary but preferred embodiment of a workpiece transfer apparatus of the invention is illustrated semi-schematically for practicing the foregoing method and for operation in the system of the invention. It will be seen that the pair of laterally spaced apart outer workpiece carrier rails 26 and 28, and the pair of laterally spaced apart inner workpiece carrier rails 20 and 22 which alternately underlie the workpieces, each may constitute, as an operable subcombination, a substantial portion of the structure, but not the cycle, of a conventional shuttle mechanism similar to that set forth in the aforementioned U.S. Pat. No. 4,669,607. Thus each of the outer rails 26 and 28 are mounted to reciprocate on underlying laterally spaced apart support tracks or rails 40 and 42 respectively by a series of roller supports 44 and 46 suitably provided therebetween (FIGS. 4 and 7). Likewise, the inner pair of carrier rails 20 and 22 are similarly mounted to reciprocate on underlying laterally spaced apart support tracks or rails 48 and 50 respectively (FIG. 7). In shuttle mechanism terminology the carrier rails 20, 22 and 26, 28 are sometimes referred to as the "live" rails, whereas the associated support rails 48, 50 and 40, 42 respectively are sometimes termed "dead" rails. That is, such "dead" rails are mounted and operated to move only vertically relative to the fixed support frame work of the transfer mechanism, whereas the live rails, being carried on the dead rails, also move vertically therewith and, in addition move horizontally so as to reciprocate through advance and retract strokes relative to the dead rails so that each of these shuttle mechanisms is operable as a "lift and carry" type shuttle mechanism.

However, in accordance with another feature of the present invention, these two shuttle mechanism subcombinations are cooperatively interrelated to provide a novel dual shuttle combination by nesting inner rail shuttle 20, 22, 48, 50 closely adjacent and laterally between, and generally longitudinally within, outer rail shuttle 26, 28, 40, 42, as best seen in FIGS. 5, 6 and 7. In addition a novel cooperative driving apparatus is provided for causing these two shuttles to operate in the manner and mode described previously in conjunction with FIGS. 1–3A–H, whereby each of the shuttles causes its associated workpiece carrier rails to move in two laterally spaced vertical travel planes closely adjacent but clear of those of the other shuttle, and 180° out of phase through closed loop rectangular travel paths U1, U7, L7, L1 and back to U1 described in conjunction with FIGS. 1–3H. The motion of these two shuttles is mechanically synchronized to be 180° out-of-phase with one another with respect to such carrier rail travel directional and positional motion.

Shuttle Carrier Rail Drive

In accordance with another feature of the present invention the two pairs of carrier rails 20, 22 and 26, 28 are reciprocated in their advance and retract strokes horizontally in mutually opposite directions in a 180° out-of-phase relationship by a gear drive transmission unit 60 shown in FIGS. 4–6. Drive unit 60 is operatively coupled to each shuttle mechanism via an outside pair of racks 62 and 64 and by an inside pair of racks 66 and 68 which respectively horizontally reciprocate outer carrier rails 26, 28 and inner carrier rails 20, 22. Each rack 62–68 is supported and guided for horizontal movement longitudinally of the fixed transfer mechanism support structure by a series of conventional support stands 70 provided at suitable locations on and along the transfer mechanism framework 72 (FIG. 4), as well as by suitable similar roller guide supports 71 and 73 (shown partially in FIG. 6) mounted in the framework of drive unit 60.

Figure 8:
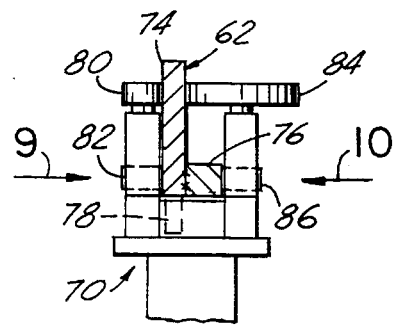
FIG. 8 is a fragmentary diagramatic end view of a portion of the shuttle support mechanism shown in FIG. 4.
Figure 9:
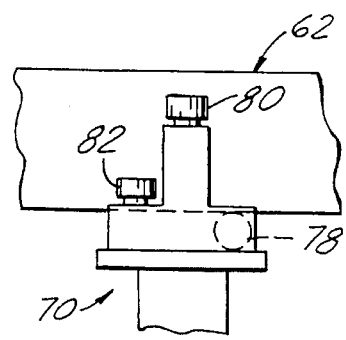
FIG. 9 is a fragmentary semi-diagramatic view of the apparatus shown in FIG. 8 as viewed on the line 9 in FIG. 8.
Figure 10:
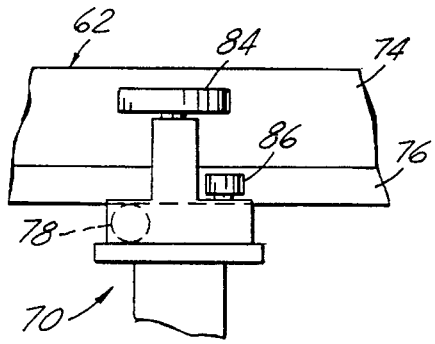
FIG. 10 is another semi-diagramatic fragmentary elevational view of the apparatus shown in FIG. 8 as viewed on the line 10 in FIG. 8.

As shown in more detail in FIGS. 8–10, each rack 62–68 comprises a rectangular beam 74 mounted with its width dimension upright and its length dimension horizontal, and includes a rack tooth bar 76 affixed to its outer surface adjacent the lower edge of beam 74 and provided with rack gear teeth along its lower edge. Support stand 70 includes a support roller 78 on which the lower edge of beam 74 rolls to vertically support the rack. Stand 70 also includes a pair of vertically spaced guide rollers 80 and 82 which roll along the inner side of beam 74, and another pair of vertically spaced guide rollers 84 and 86 for rotatably respectively against the opposite side surfaces of beam 74 and bar 76, thereby supporting and guiding beam 74 in its upright orientation. It is to be understood that the remaining racks 64, 66 and 68 are constructed and supported in like manner.

Drive unit 60 includes a known transfer drive motor and transmission unit 90, preferably that commercially available from the assignee of record herein, Lamb Technicon of Western Atlas, as a Model L-168-262 nine inch 2 radian transfer drive. Transfer drive unit 90 has a rotary output shaft 92 coupled to a primary gear driving shaft 94 rotatably journalled in the frame of unit 60 for rotation about its axis 96. A secondary gear driving shaft 98 is also rotatably journalled in unit 60 parallel to and laterally adjacent primary shaft 94. Shaft 94 carries a drive gear 100 which meshes with a driven gear 102 affixed on the end of shaft 98 such that primary and secondary gear shafts 94 and 98 are driven in unison at a one-to-one ratio but in opposite rotary directions.

Primary shaft 94 carries a pair of gears 106 and 108 affixed thereto which individually mesh with the underside rack teeth of the respectively associated outside shuttle rack bars 76 and 110 of racks 62 and 64 (FIG. 6). Secondary gear shaft 98 likewise has a pair of gears 112 and 114 affixed thereon and meshing with the inside rack bars 116 and 118 of racks 66 and 68 respectively (FIG. 6). Thus, as primary shaft 94 is rotatably driven from drive unit 90, outside racks 62 and 64 are driven horizontally in one direction while simultaneously inside racks 66 and 68 are driven horizontally in the opposite direction, thereby producing horizontal rack reciprocation in synchronism and in a 180° out-of-phase relationship.

Each of the racks 62–68 is respectively drivingly coupled to an associated live rail 20, 22, 26, 28 by individually associated bracket and roller mechanisms 120, 122, 124 and 126 respectively (FIGS. 4 and 6). Each drive bracket 120–126 comprises a trapezoidal plate 130 mounted upright and fixed to the upper edge of the associated rack beam 74. Bracket plate 130 carries a vertically extending track bar 132 on its upright surface facing the associated live rail 26, bar 132 extending vertically a distance at least slightly greater than the vertical legs L1-U1 or L7-U7 of the live rail travel motion path. Live rail 26 carries a pair of tracking rollers 134 and 136 (FIGS. 4 and 6) which rollably engage those opposite vertical surfaces of track bar 132 facing oppositely from one another in the direction of live rail horizontal reciprocation. In this manner, horizontal motion of drive rack 62 is transmitted through bracket 130 by track bar 132 pushing on roller 134 or roller 136, depending on the direction of rack reciprocation, thereby carrying live rail 26 along with bracket 120, while rollers 134 and 136 simultaneously roll up and down on track bar 132 to accommodate the vertical reciprocating motion of live rail 26. It is to be understood that the remaining live rails 20, 22, and 28 likewise are respectively provided with similar pairs of tracking rollers 138, 140, and 142 constructed and arranged to operate in like manner to impart horizontal reciprocating motion to these remaining live rails in accordance with such driving motion of their associated racks 68, 66 and 64 respectively.

It will thus be seen that whatever horizontal drive motion mode is computer pre-programmed for unit 90, such as end-of-stroke dwells, constant velocity, soft acceleration and/or deceleration modes, etc. as may be desired to modulate the velocity of the advance and retract horizontal reciprocating motions of both sets of inner and outer live carrier rails, such motion velocity modulation is mechanically synchronized to occur at the same time and rate (i.e., in-phase) through this dual shuttle driving arrangement while operating in a precise 180° out-of-phase horizontal reciprocating motion directional and positional relationship between each shuttle subcombination.

Dual Shuttle Lift Mechanism

In accordance with another feature of the present invention as embodied in the transfer apparatus of the invention, the interior shuttle 20, 22, 48, 50 and the exterior shuttle 26, 28, 40, 42 are raised and lowered through a relatively short vertical reciprocation strokes corresponding to the vertical legs U1-L1 and U7-L7 of the rectangular live rail travel path (FIGS. 1–3J) in 180° synchronized out-of-phase travel directional and positional relationship by a combination self-counterbalancing and lift or elevator drive mechanism of the invention. Preferably this lift mechanism comprises a series of identical elevator or lift stations 150, 152 and 154 spaced apart longitudinally along shuttle mechanism support frame work 72 (FIGS. 4 and 5) and located beneath the dual shuttle mechanisms, and constructed and arranged to carry the weight of both the associated dead rails and live rails as well as the design workpiece load being conveyed on the transfer mechanism. An associated elevator power drive mechanism 156 is also located at mid lift station 152 which is operably connected to drive all of the lift units 150, 152 and 154 in unison.

Lift station 152 comprises a suitable support frame work 158 (not shown) and bearings (not shown) which rotatably support a torque tube type drive shaft 160 for rotary oscillating motion about its rotational axis 162. Likewise, upstream end lift station 150 has a similar framework 164 which rotatably supports a torque tube type drive shaft 166 for rotary oscillating motion about its rotational axis 168. Similarly, downstream end lift station 154 has a suitable framework 170 which rotatably supports a torque tube type drive shaft 172 for rotary oscillating motion about is rotational axis 174.

As best seen in FIGS. 4, 5 and 7, drive shaft 166 of lift station 150 carries four crank arms 180, 182, 184 and 186 (FIGS. 4 and 7) cantilever mounted and affixed thereon for bodily pivotal movement about the rotational axis 168 of shaft 166. Each crank arm 180–186 has an associated lift bar 190, 192, 194 and 196 respectively pivotably coupled at its lower end to the outer free end of the associated crank arm. Each lift bar 190–194 extends vertically from its associated crank arm up to an associated dead rail 42, 48, 50, and 40 respectively and is suitably rigidly connected to the dead rails. The rigid connection transfers the crank arm arc path to the dead rail. However, the live rails 20, 22, 26, 28 being disciplined by rack trapezoid 120 are lifted and lowered in a straight line path.

As best seen in FIGS. 4 and 7, again with reference to upstream lift station 150 but replicated in lift stations 152 and 154, and in accordance with the self-counterbalancing feature of the invention, the lift crank arms 180 and 186 for the outside shuttle mechanism 26, 28, 40, 42 are carried on shaft tube 166 diametrically opposite the crank arms 182 and 184 which carry the inside shuttle mechanism 20, 22, 48, 50. Also, the crank articulation to the lift bars is constructed and arranged such that the moment arms for the associated outside shuttle lift bars 190 and 196 are equal to those of lift bars 192 and 194 of the inside shuttle mechanism, such respective moment arms being spaced 180° apart around the pivot axis 168 of torque tube 166. Thus, the entire unloaded weight of the outside shuttle mechanism is continuously counterbalanced, through the counterbalancing linkage provided by crank arms 180 and 186, torque tube 166 and the crank arms 182 and 184, with the entire unloaded weight of the inside shuttle mechanism, regardless of the relative vertical positions of the shuttle mechanism throughout their path of travel in a given work cycle. Hence the driving forces applied to the lift stations 150, 152 and 154 need only be designed to carry the weight load of the workpieces being supported on the respective shuttle mechanisms. In many applications, such as in the illustrated example of transporting automotive body door panels A, B and C, which are relatively light weight parts, the workpiece load is substantially less than the weight load of the shuttle mechanisms themselves. Consequently the size and power rating of the elevator power drive mechanism 156 can be significantly reduced. It also will now be understood that the lift station shafts 166, 160 and 172 and associated support linkage components perform the multiple functions of (1) torque transmitting elevator driving mechanisms, (2) counterbalancing beams, and (3) longitudinally distributed live load weight sharing.

As shown in FIGS. 4, 5 and 7, power drive mechanism 156 preferably includes a known electro-mechanical double pump drive unit 200 such as that commercially available from the assignee of record herein, Lamb Technicon division of Western Atlas, as its Model No. L-168-185. Drive unit 200 includes a longitudinally reciprocable rack drive arm 202 having a yoke 204 at one end pivotably coupled to the free end of a crank arm 206 affixed at its other end to torque tube 160. Drive unit 200 is suitably programmed and controlled to reciprocate arm 202 to impart, via crank 206, an oscillating rotary motion to torque tube 160. Arm 202 is mounted in drive 200 so as to be free to pivot during such reciprocating motion to accommodate the arc of travel of the pivot coupling between yoke 204 and the free end of crank arm 206.

The rotary oscillating motion imparted to torque tube 160 at station 152 thus operates the associated pair of inside shuttle lift bars 192' and 194' through a vertical path of travel, and likewise outside shuttle lift bars 190' and 196', synchronously in a 180° out-of-phase vertical reciprocation relationship through the vertical legs U1-L1 and U7-L7. It also is to be understood that drive units 90 and 200 are readily programmed through conventional computerized operably interconnected controller set-ups to operate in timed relationship to accomplish the compound vertical and horizontal reciprocation operation of the dual shuttle mechanism to thereby provide the aforementioned alternating lift and carry "hand-off" mode of operation of the dual shuttle system and method of the invention.

The remaining shuttle mechanism lift stations 150 and 154 are slaved to the lift drive of station 152 by means of a drag link power coupling mechanism shown in FIGS. 4 and 7. In constructing this mechanism, each of the torque tubes 166, 160 and 172 is respectively provided with a crank arm 210, 212 and 214 each pivotally coupled at their respective free ends to a common drag link 216. Hence the rotary oscillatory motion imparted to torque tube 160 by drive 156 is transmitted through crank arm 212 to horizontally reciprocate drag link 216 which in turn transmits and imparts through crank arms 210 and 214 like oscillatory motion to torque tubes 166 and 172. The slight rise and fall of drag link 216 during its reciprocating motion is accommodated by a clearance opening 218 (FIG. 7) provided in the framework 164 of station 150, and similar link travel clearance openings are provided in the framework of stations 152 and 154.

Operation of Dual Shuttle Transfer Apparatus

From the foregoing it will be seen that the preferred embodiment of the dual shuttle transfer apparatus constructed in accordance with FIGS. 4–10 is particularly well suited to operate in the mode described previously in conjunction with the system and method as referenced in FIGS. 1–3J. The 180° out-of-phase travel direction and position relationship between live rails 20, 22 and 26, 28 in their horizontal reciprocating motion on their advance/carry and retraction travel strokes is precisely mechanically synchronized through the structure and operation of rack drive unit 60. Likewise, the 180° out-of-phase lift and lower vertical reciprocation travel strokes of live rails 20, 22 and 26, 28 are precisely mechanically synchronized through the power drive unit 156 operably coupled to the rails through lift station 152 and slaved by drag link 216 to lift stations 150 and 154. Hence all that remains for set-up adjustment is the programming of the power drive units 90 and 156 through their aforementioned conventional computerized programmers and controlling systems to thereby synchronize the mode of operations of these drive units in a suitable interrelated manner such as to operate the dual shuttle mechanisms in the aforementioned 180° out-of-phase relationship as explained in conjunction with FIGS. 1–3J. Also, due to the mechanical drive and support intercoupling between each shuttle subcombination, any modulation of the travel velocity mode of one is automatically imparted to the other in a precise in-phase relationship.

Referring to FIG. 7, in accordance with a further feature of the invention each set of live rails 20, 22 and 26, 28 of the dual shuttle mechanism is provided with its own special sets of the aforementioned workpiece receiving nests. In the exemplary case of conveying the autobody door panels A, B, C, etc., the outside rails 26 and 28 are each provided with suitably custom contoured part support nests 220 and 222 laterally aligned with one another and located in sets at predetermined, equally spaced increments so as to provide a nest for individually receiving and holding workpieces A, B and C, etc., at appropriate equally spaced increments longitudinally of the rails. The inside live rails 20 and 22 are also provided with a unitary part receiving nest support 224 at correspondingly longitudinally spaced increments therealong. It will be seen in FIG. 7 that the set of outside rail nests 220, 222 are designed to be spaced apart laterally of the rails to provide lift-through side clearance for the unitary nest 224 which straddles inside rails 20 and 22. It also is to be understood that nests 220, 222 and 224 are suitably contoured and structured to accurately receive, locate and hold each associated workpiece thereon utilizing only gravitational forces in accordance with conventional transfer mechanism practice.

However, in accordance with the present invention these workpiece nests are designed for cooperative hand-off operation alternating between the inside and outside shuttle mechanisms. To accomplish this the nest locations along the rails of the inside and outside shuttles are oriented and located such that the row of nests 220 and 222 of the outside rails 26, 28 are in horizontal but non-interfering alignment with the row of nests 224 of the inside rails 20, 22 at the midpoint vertical travel elevation M, and are spaced vertically clear of one another when the respective inside and outside rails reach their vertical end point elevations U and L for horizontal travel on their respective part-loaded advance/carry and part-empty retraction strokes. Thus when the hand-off sequence occurs as explained in conjunction with FIGS. 3D–3E, and FIGS. 3G and 3H, all the nests of the set of live rails receiving the workpieces from the other set of live rails are empty and precisely located to pick-up the workpieces and lift them off of the other rail set, and thereby empty all of the loaded nests, and vice versa.

Advantages

From the foregoing description, it will now be apparent the several novel features of the system, method and apparatus of the invention amply fulfill the aforestated objects of the invention, and in doing so provide many advantages over prior art conventional lift and carry or carry and lift transfer systems as well as conventional endless loop conveyor systems. Because the transfer system of the invention provides a dual shuttle mechanism with shuttles operably internested with one another and operable in an out-of-phase travel relationship, and cooperable to perform alternate workpiece hand-off one to the other, the combination dual shuttle mechanism can convey the workpieces in a lift and carry transfer mode in half the ordinary cycle time of a conventional shuttle type transfer mechanism. As the workpieces are raised by one set of transfer live rails, vertical clearance is thereby established for returning the companion set of live rails. Hence, the empty live rails return for upstream part loading and hand-off pick-up operation while the other set of rails are advancing the workpieces, all in one cycle increment of drive motion imparted to the mechanism.

In the illustrated embodiment of FIGS. 4–10, the total vertical stroke is preferably about six inches, i.e., vertical distance of legs U1-L1 and U7-L7, inasmuch as the lift function is provided only to pick up and elevate workpieces out of the upstream loading station and to provide clearance for the empty nests of the companion shuttle mechanism to enable them to pass horizontally beneath the part loaded nests on the elevated carrier rails. This vertical lift clearance thus need only be enough to allow the nest structures on the respective live rails to clear one another as well as to clear any part profile protuberances caused by part bowing, sag or unusual part shape. It will be understood in this connection that in a theoretical set-up in which perfectly flat, straight and rigid workpieces were being carried in the rail straddle support relationship on the live rails, and having a minimum of nesting structure projection above the upper surfaces of the rails, and assuming that no stress-induced sag, bowing or dimensional variation in the shuttle mechanism structure, the total lift stroke could be reduced to as little as one-half inch without thereby modifying the aforementioned workpiece advance mode of alternating hand-off via the two shuttle mechanism with a part array hand-off action occuring between each part advance travel increment.

Because of the foregoing features and advantages, the transfer system and method of the invention employed in the advancing of the workpieces can be economically constructed from and performed by transfer mechanism components which for the most part are standard and commercially available, and yet made to operate with a part loading cycle rate twice that of conventional shuttle type transfer mechanisms. Thus when provided to handle unloading of a rapid progressive die transfer press operating to cycle out each part every three to four seconds, the dual shuttle mechanism of the invention can readily keep up with this loading rate, whereas a conventional shuttle mechanism operating in a lift and carry mode could not accommodate such a transfer press output rate because it would require, on a comparable basis, a minimum cycle time of at least six seconds.

Moreover, because a standard lift drive mechanism 156 and a standard rack drive mechanism 90 can be utilized, all of the desirable transfer cycle travel velocity modulations can be programmed into the shuttle mechanisms, such as dwell, easy stop, easy start, soft lift, soft drop, etc., and the rectangular closed loop travel path can be modified into other polygonal travel paths for each shuttle mechanism. In addition, because the dual shuttle transfer mechanism of the invention operates plurally with cooperating coexistant shuttle actions, the number of stops and starts of the drive motors 90 and 200 can be cut in half thereby reducing the duty cycle requirements of the entire mechanism. Additionally, this reduces horse power needed for the drive motors and helps to prevent motor overheating resulting from excessive rapid and repetitive start cycles.

It will also be understood, that, although other types of shuttle lift mechanisms may be provided to operate in accordance with the invention, the particular combined self-counter balancing and power drive embodiment of FIGS. 4–10 is preferred because it eliminates the need for the more complicated and expensive conventional air or other counterbalancing systems of the prior art. Likewise other conventional types of transfer drive systems can be employed but the particularly mechanically interlinked lift elevators and mechanically interlinked rack advance and retract drive mechanisms are preferred for their accuracy, simplicity and easily maintained, mechanically synchronized operation.

As indicated previously in conjunction with FIG. 3H, robotic or other automated workpiece conveyor unloading mechanisms operating at a slower cycle time than the part loading cycle required to keep up with a rapid upstream conveyor loading input rate can now be utilized in conjunction with a transfer shuttle mechanism of the invention having a part nesting capacity to cue up two or more workpieces downstream in a row of unloading stations. The precise location and timing provided by a shuttle type transfer mechanism can now be made available to cooperate with the slower cycle time required for an array of robotic unloaders programmed to unload simultaneously and individually a row of the workpieces lined up in two or more unloading stations downstream from the loading station of the conveyor. The invention thus provides a shuttle type transfer automation system having twice the load and unload speed hitherto obtainable from conventional transfer mechanisms. The system also enables the use of less expensive automated robotic part handling devices, i.e., typically, the slower the cycle time required of automated robotic part handling mechanism, the less expensive and more accurate and reliable they become.

It will also now be understood that the transfer system, method and apparatus of the invention may be modified to incorporate a variety of work stations located at each hand-off station along the line, with a suitable dwell incorporated into the travel path of the shuttle travel cycle to enable a work operation to be performed at such work stations. For example, various types of short cycle painting, stenciling, marking, or masking operations typically automatically performable by robotic mechanisms can be incorporated into the transfer line. Since such work operations typically do not impose excessive vertical loading on the workpieces, the live rails and associated workpieces thereon have sufficient strength to withstand such light duty work cycle vertical loading.

In addition, it is feasible to incorporate a plurality of longitudinally spaced apart fixed stations along the transfer line each having a conventional workpiece support constructed and arranged to individually receive and stationarily hold workpieces at for example, the middle elevation M of the vertial rail lowering stroke. The elevated live rails advancing the workpieces would then lower the same onto such fixed work stations supports during this descent from path point U7 to path point M7. Work could then be performed on the part during the dwell phase at this point in the travel cycle. Then the empty rails moving up from the path point M1 toward path point U1, while picking up a workpiece at the upstream loading station, would likewise pick up the workpiece from the fixed station to elevate it and further advance it along the line. Of course, automated machine tooling, punch tooling or the like provided to cooperate with such a fixed work station along the line must be designed to provide operating clearance for the dead and live rails of both shuttle mechanisms, and the cycle time of the machining tool or other operation should be of the short cycle type, particularly in those applications where the total cycle time of the transfer mechanism is designed to keep up with a rapid part-loading cycle conveyor input rate. In any event, in modern high speed repetitive mass production manufacturing operations, wherein part transfer time is considered "dead time", i.e., no value is therein added, modifying the system of the invention in the aforementioned manner can greatly increase production efficiency. Additionally, the amount of vertical travel or lift required of each of the dual shuttles may be designed to be only one-half that of a conventional shuttle mechanism since its total vertical travel is divided between the two shuttle mechanisms.

By way of example and not by way of limitation, in one application intended for the transfer apparatus as described in conjunction with FIGS. 4–10 operating in the method and mode of FIGS. 1–3J, the following design parameters may be observed:

1. Length and Width dimensions of automotive body door panels A, B, C, etc. - - - 45"×48"

2. Transfer press cycle rate of press unloader TP— - - 900

3. Distance of advance/retract stroke from travel path point U1-U7 - - - 78 inches 4. Vertical distance of travel path between points L1 and U1 - - - 6 inches
5. Transfer press unload interference time window - - - 0.5 seconds
6. Cycle time for advance/retract stroke between path points L1 and L7 - - - 1.50 seconds
7. Travel time to complete travel on vertical leg between path points L1 and U1 - - - 1.00 seconds
8. Dwell time at part load position and robot unload position - - - 1.5 seconds
9. Total cycle time - - - 4 seconds
10. Maximum part loading rate - - - 900 parts per hour It is also to be understood that the live rail closed loop travel path of each shuttle of the dual shuttle mechanisms may be modified from the rectangular path of FIGS. 1–3J by suitable modifying the timing program of drives 156 and 90 relative to one another so as to, for example, round off the corners of the rectangle, as well as to describe a closed travel path having a polygonal shape other than rectangular, such as other parallelograms, trapezoids, diamond shapes, as well as circular shapes such as circles, elipses, ovals, etc. However, the substantially rectangular closed loop travel path in a vertical plane is presently believed to be the preferred geometry.

It is to be further understood that, although the foregoing description and drawings describe and illustrate in detail a preferred embodiment of the present invention, to those skilled in the art to which the present invention relates the present disclosure will suggest many modifications and constructions as well as widely differing embodiments and applications without thereby departing from the spirit and scope of the invention. The present invention, therefore, is intended to be limited only by the scope of the appended claims.

I claim:

1. A transfer system for conveying workpieces successively seriatum through a generally horizontally arranged line of multiple stations comprising transfer mechanism conveyor means operable in an intermittent repetitive lift and carry workpiece travel cycle mode, said system performing the steps of:

(a) loading a first of the workpieces into a given loading position at an upstream loading station means of said conveyor means, (b) lifting the first workpiece out of said loading station means, (c) carrying the first workpiece on said conveyor means generally horizontally while so lifted downstream to a first hand-off station means of said conveyor means spaced a given distance horizontally remote downstream from said loading station means, (d) loading a second of the workpieces into the loading position at said loading station means during the performance of step (c), (e) lifting the second workpiece out of said loading station means while lifting the first workpiece on said conveyor means in said first hand-off station means, (f) carrying the second workpiece on said conveyor means while so lifted generally horizontally downstream to said first hand-off station means while simultaneously carrying the first workpiece while so lifted on said conveyor means generally horizontally downstream to a second station means of said conveyor means spaced the given distance horizontally downstream from the first hand-off station means.

2. The transfer system of claim 1 including means constructed and arranged to perform the further steps of:

(g) loading a third of said workpieces into said load station means during the performance of step (f), and (h) lifting the first and second workpieces respectively in said second station means and first hand-off station means while lifting the third workpiece out of said loading station means, said apparatus further including unloader means operable for simultaneously unloading the first and second workpieces from said line of multiple stations by lifting them out of said first hand-off station means and second station means and from the line of stations to thereby vacate the first and second station means.

3. The transfer system of claim 1 comprising first and second sets of internested carrier rails operable to perform the functions of steps (a) through (f) and movable through identical closed loop travel paths disposed in non-interfering laterally spaced apart vertical planes and horizontally aligned coincident with one another, said rails being oriented such that said travel paths traverse said loading and hand-off station means in a generally vertically travel mode and generally horizontally advance and retract therebetween at elevations disposed respectively above and below the loading position and hand-off elevation at said hand-off station means, and including drive means for operating said first and second carrier rails in a 180° out-of-phase travel relationship through their respective travel paths.

4. The transfer system of claim 3 further comprising balancing beam means and linkage means mechanically interconnecting said first and second sets of carrier rails to said balancing beam means and operable to cause the weight of said first carrier rail set to counterbalance the weight of said second carrier rail set.

5. The apparatus of claim 1 wherein said unloader means simultaneously unloads the first and second workpieces from said line of multiple stations while said transfer mechanism is not operating and the first and second workpieces are disposed generally vertically immediately adjacent the second and first station means.

6. A transfer system for respectively conveying workpieces successively seriatum through a generally horizontally arranged line of multiple stations on transfer mechanism conveyor means operable in an intermittent repetitive lift and carry workpiece travel cycle mode, comprising the steps of arranging and operating two individually operable transfer shuttles to perform the following workpiece handling steps:

(a) loading a first of the workpieces into a given loading position at an upstream loading station of one of the transfer shuttles, (b) operating the one shuttle to lift the first workpiece out of the loading station, (c) carrying the first workpiece generally horizontally while so lifted on the one shuttle downstream to a hand-off station a given distance horizontally remote downstream from the loading station, (d) loading a second of the workpieces into the loading position at the loading station during the performance of step (c), (e) causing the other shuttle to lift the second workpiece out of the loading station while causing the other shuttle to lift the first workpiece off the one shuttle in the first hand-off station, (f) carrying the second workpiece while so lifted on the other shuttle generally horizontally downstream to the hand-off station while simultaneously carrying the first workpiece on the other shuttle while so lifted on the conveyor means generally horizontally downstream to another station spaced the given distance horizontally downstream from the first hand-off station.

7. The transfer system of claim 6 further comprising the steps of providing an unloader apparatus for simultaneously unloading the first and second workpieces from the line of multiple stations by lifting the second and first workpieces out of the first and another stations and from the line of stations of the system to thereby vacate the first and another stations while the first and second workpieces are generally vertically immediately adjacent the another and first stations and the transfer mechanism conveyor means is not operating to move any workpieces.

8. A method of repetitively conveying workpieces successively through a generally horizontally arranged line of multiple stations on transfer mechanism conveyor means operable in an intermittent repetitive lift and carry workpiece travel cycle mode, comprising the steps of arranging and operating the mechanism conveyor means to perform repetitive cycles each including the following workpiece handling steps:

(a) loading a first of the workpieces into a given loading position at an upstream loading station of the conveyor means, (b) causing the conveyor means to lift the first workpiece out of the loading station, (c) carrying the first workpiece generally horizontally while so lifted on the conveyor means downstream to a first hand-off station of the conveyor means spaced a given distance horizontally remote downstream from the loading station, (d) loading a second of the workpieces into the loading position at the loading station during the performance of step (c), (e) causing the conveyor means to lift the second workpiece out of the loading station while causing the conveyor means to lift the first workpiece out of the first hand-off station, (f) carrying the second workpiece while so lifted generally horizontally on the conveyor means downstream to the first hand-off station while simultaneously carrying the first workpiece while so lifted on the conveyor means generally horizontally downstream to a second station of the conveyor means spaced the given distance horizontally downstream from the first hand-off station.

9. The method of claim 8 including arranging and operating the mechanism means to perform the further steps of:

(g) loading a third of the workpieces into the loading station during the performance of step (f), (h) causing the conveyor means to lift the first and second workpieces respectively in the second station and first hand-off station while lifting the third workpiece out of the loading station, and (i) providing means for simultaneously unloading the first and second workpieces from the line of multiple stations by lifting the second and first workpiece out of the first and second stations and from the line of stations to thereby vacate the first and second stations.

10. The method of claim 8 wherein the sequence of steps is performed by providing first and second sets of internested carrier rails movable through identical polygonal closed loop travel paths disposed in non-interfering laterally spaced apart vertical planes and with the paths horizontally aligned coincident with one another, orienting said rails such that their travel paths traverse the loading and hand off stations in a generally vertical travel mode and to generally horizontally advance and retract therebetween at elevations disposed respectively above and below the loading position and hand off station, and operating said first and second carrier rails in a 180° out-of-phase travel relationship through their respective travel paths.

11. The method of claim 8 comprising the further steps of providing a balancing beam mechanism and mechanically interconnecting the first and second sets of carrier rails to the balancing beam mechanism with an articulated linkage in a manner to cause the weight of the first carrier rail set to counterbalance the weight of the second carrier rail set.

12. The method of claim 8 comprising the further steps of providing an apparatus for simultaneously unloading the first and second workpieces from the line of multiple stations by lifting the second and first workpieces out of the first and second stations and from the line of stations to thereby vacate the first and second stations while neither of the shuttles are operating.

* * * * *